United States Patent
Allen et al.

(10) Patent No.: US 11,006,101 B2
(45) Date of Patent: May 11, 2021

(54) VIEWING DEVICE ADJUSTMENT BASED ON EYE ACCOMMODATION IN RELATION TO A DISPLAY

(71) Applicant: Hewlett-Packard Development Company, L.P., Houston, TX (US)

(72) Inventors: Will Allen, Palo Alto, CA (US); Nelson L Chang, Palo Alto, CA (US); Irwin Sobel, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/764,702

(22) PCT Filed: Jan. 29, 2016

(86) PCT No.: PCT/US2016/015769
§ 371 (c)(1),
(2) Date: Mar. 29, 2018

(87) PCT Pub. No.: WO2017/131770
PCT Pub. Date: Aug. 3, 2017

(65) Prior Publication Data
US 2018/0288405 A1  Oct. 4, 2018

(51) Int. Cl.
*H04N 13/383* (2018.01)
*G06F 3/01* (2006.01)
(Continued)

(52) U.S. Cl.
CPC ....... *H04N 13/383* (2018.05); *G02B 27/0093* (2013.01); *G02B 30/23* (2020.01);
(Continued)

(58) Field of Classification Search
CPC .... H04N 13/383; H04N 13/279; G06T 15/10; G06F 3/013; G02B 27/0093; G02B 27/2207
See application file for complete search history.

(56) References Cited

U.S. PATENT DOCUMENTS 5,861,936 A * 1/1999 Sorensen ............... G02C 7/083
351/200
6,094,182 A * 7/2000 Maguire, Jr. ........ H04N 13/383
345/9
(Continued)

FOREIGN PATENT DOCUMENTS

CN    1685273    10/2005
CN    104641278   5/2015
(Continued)

OTHER PUBLICATIONS

Kim, D.Y. Theoretical Considerations on Compensation of the Aocommodation-Vergence Mismatch by Refractive Power of Focus-adjustable 3D Gasses.
(Continued)

*Primary Examiner* — Vinh T Lam
(74) *Attorney, Agent, or Firm* — Tong Rea Bently & Kim LLC

(57) ABSTRACT

Examples disclosed herein relate to viewing device adjustment based on eye accommodation in relation to a display. In one implementation, a computing device determines accommodation information related to a viewer's focus on an image rendered on a display. The computing device may cause an optical component associated with a viewing device to adjust based on the determined accommodation.

13 Claims, 5 Drawing Sheets

(51) Int. Cl.
*G06T 15/10* (2011.01)
*H04N 13/279* (2018.01)
*G02B 27/00* (2006.01)
*H04N 5/232* (2006.01)
*G02B 30/23* (2020.01)

(52) U.S. Cl.
CPC ............ *G06F 3/013* (2013.01); *G06T 15/10* (2013.01); *H04N 5/23212* (2013.01); *H04N 13/279* (2018.05)

(56) References Cited

U.S. PATENT DOCUMENTS

| | | |
|---|---|---|
| 6,994,182 B2 | 2/2006 | Wang |
| 9,265,458 B2* | 2/2016 | Stack .................... A61B 5/163 |
| 9,292,973 B2* | 3/2016 | Bar-Zeev ............... G06F 3/012 |
| 9,304,319 B2* | 4/2016 | Bar-Zeev ............... G06F 3/011 |
| 9,323,325 B2* | 4/2016 | Perez .................... G06F 3/017 |
| 10,678,052 B2* | 6/2020 | Ouderkirk ............... G02B 5/30 |
| 2006/0232665 A1 | 10/2006 | Schowengerdt |
| 2011/0075257 A1 | 3/2011 | Hua |
| 2013/0076889 A1 | 3/2013 | Bublitz et al. |
| 2013/0300634 A1 | 11/2013 | White |
| 2014/0092006 A1 | 4/2014 | Boelter et al. |
| 2014/0292749 A1* | 10/2014 | Vaganov ............. G06F 3/04815 345/419 |
| 2014/0347456 A1* | 11/2014 | Kato .................... H04N 13/332 348/59 |
| 2015/0022887 A1 | 1/2015 | Larson et al. |
| 2015/0187115 A1* | 7/2015 | MacDonald ........... G06F 3/013 345/419 |
| 2015/0215601 A1* | 7/2015 | Zhou .................. G06F 3/04847 348/43 |
| 2015/0243093 A1 | 8/2015 | Schowengerdt |
| 2015/0288944 A1* | 10/2015 | Nistico .................. G06T 15/20 345/156 |
| 2015/0312560 A1* | 10/2015 | Deering ................ A61F 2/1602 345/1.3 |
| 2015/0356714 A1* | 12/2015 | Moalem .................. G06T 5/003 345/207 |
| 2016/0260258 A1* | 9/2016 | Lo ...................... G02B 27/0172 |
| 2016/0286177 A1* | 9/2016 | Border ............. G02B 27/0176 |
| 2017/0123210 A1* | 5/2017 | Blanco ................... G06F 3/013 |
| 2017/0148215 A1* | 5/2017 | Aksoy .................... G06F 3/013 |
| 2017/0160518 A1* | 6/2017 | Lanman ............... G06T 19/006 |
| 2017/0160798 A1* | 6/2017 | Lanman ............ G02B 27/0172 |
| 2017/0227774 A1* | 8/2017 | Cherdakov ........ H04N 21/4223 |
| 2017/0315348 A1* | 11/2017 | Hayashi .................. G09G 3/36 |
| 2018/0003962 A1* | 1/2018 | Urey .................. G02B 27/0093 |
| 2018/0341110 A1* | 11/2018 | Hirata ................ G02B 27/0101 |

FOREIGN PATENT DOCUMENTS

| | | |
|---|---|---|
| CN | 204331144 | 5/2015 |
| EP | 2408217 | 1/2012 |
| WO | WO-2015-094191 A1 | 6/2015 |

OTHER PUBLICATIONS

Takashi Shibata at al.: "Visual discomfort with stereo displays: Effects of viewing distance and direction of vergence-accommodation conflict" Stereoscopic Displays.

Hoffman, David M. et al. "Vergence-accomodation conflicts hinder visual performance and cause visual fatigue", Journal of Vision, Mar. 28, 2008, vol. 8, No. 3.

* cited by examiner

VIEWING DEVICE ADJUSTMENT BASED ON EYE ACCOMMODATION IN RELATION TO A DISPLAY

BACKGROUND

An image may be rendered on a display to provide a depth effect to an object in the image in relation to a display. The 3D effect may be created, for example, by rendering an image with a left eye and right eye image with different chromatic filters or shuttering between a left eye and right eye image. A depth effect may be provided for a single eye by adjusting focus of the eye. In one implementation, viewer eyewear may be used to create the depth effect.

BRIEF DESCRIPTION OF THE DRAWINGS

The drawings describe example embodiments. The following detailed description references the drawings, wherein.

DETAILED DESCRIPTION

In one implementation, an optical component associated with a viewing device is adjusted dynamically in response to viewer eye accommodation information in relation to a display. For example, a computing system may include an eye sensor, display, and viewing device, and the computing system may update an optical component, such as a lens, associated with the viewing device based on accommodation information from the eye sensor. The computing system may adjust the optical component based on the eye accommodation measurement such that the display surface is in focus on the viewer's retina. For example, a viewer of a 3D image may focus at the focal distance of a virtual object in the image that may appear at a distance different than the distance of the display surface. The viewing device adjustment may cause the viewer's focus to change from the virtual object distance to the display surface distance.

Adjusting the actual focal distance from the virtual image object distance to the display surface may decrease eye strain for a viewer of a 3D Image where the target depth of an object rendered on the display is different from the distance of the display itself from the viewer. Using actual eye accommodation measurements may result in better accuracy in measuring focal distance than methods for estimating eye focal distance. In addition, measuring eye accommodation based on an eye retinal measurement may allow for a more accurate measurement to be determined when based on a measurement of one eye.

In one implementation, the computing system determines eye gaze position relative to an image in addition to the accommodation information. The computing system may determine a virtual focal object in an image based on the gaze position information and the accommodation information, such as where the gaze position information is used to identify an area along the display surface, and the accommodation information is used to determine the focal object based on the focal depth at the identified area. The computing system may re-render the image based on information about the virtual focal distance, such as to create a depth of field or other enhancement effect based on the virtual focal distance and/or focal object. The image re-rendering may be used to create more realistic or other targeted visual effects.

Figure 1:
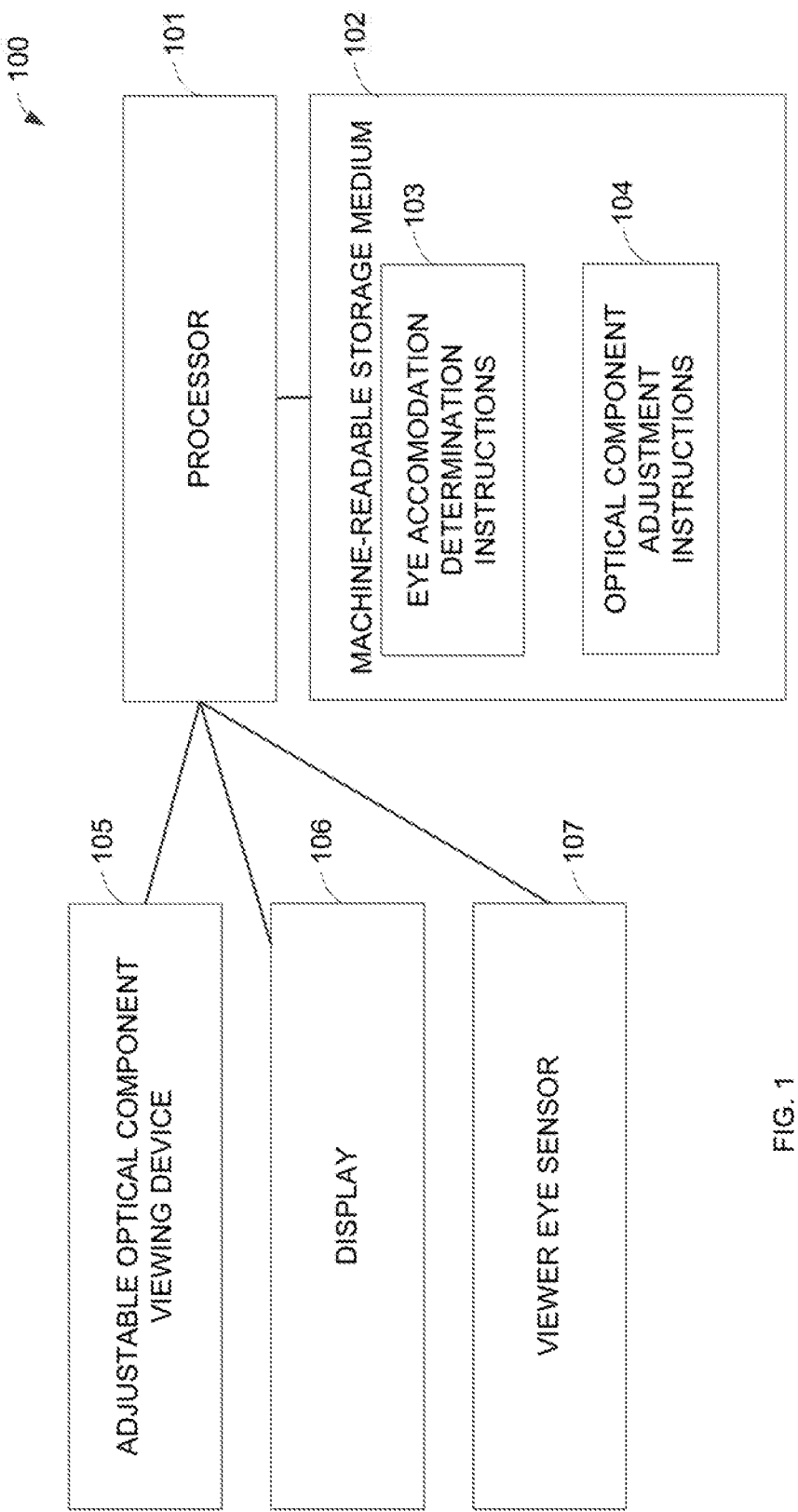
FIG. 1 is a block diagram illustrating one example of a computing system to adjust a viewing device based on accommodation in relation to a display.

FIG. 1 is a block diagram illustrating one example of a computing system to adjust a viewing device based on accommodation in relation to a display. For example, an optical component of a viewing device may be adjusted based on viewer eye information received from a sensor as the viewer views an image on a display. The computing system 100 includes a processor 101, machine readable storage medium 102, adjustable optical component viewing device 105, display 106, and viewer eye sensor 107.

The display 106 may be any suitable display. The display may be, for example, a separate computing device and/or part of headgear for providing a viewer with a virtual reality experience. The display 106 may display any type of image, such as where the display 106 renders a 2D or 3D image. The image may be any suitable image, such as a still image or video. In one implementation, the display creates a 3D image based on a left and right eye image created from separate chromatic filters and/or a shuttering effect. The display 106 may display an image such that the depth effect of an object in the image is different than the location of the surface display 106, for example, where an object in the image is intended to appear in front of or behind the display surface.

The viewer eye sensor 107 may be any suitable sensor for sensing information about a viewer's eye viewing the display 106. The viewer eye sensor 107 may include an optical sensor for measuring accommodation information based on focal position on the viewer's retina. For example, the viewer eye sensor 107 may be an optometry related sensor device. In one implementation, the viewer eye sensor 107 includes a camera. The viewer eye sensor 107 may involve a camera capturing an image of a viewer's eye while a light is aimed at the viewer's eye. The viewer eye sensor 107 may include multiple sensors for sensing different aspects of the viewer's eye behavior. The viewer eye sensor 107 may measure eye information associated with both eyes of the viewer, such as where information from the viewer eye sensor 107 may be used to determine eye vergence in relation to the display 106. In one implementation, a separate sensor measures each eye. The computing system 100 may include multiple viewer eye sensors to measure eye information associated with multiple viewers of the display 106. In one implementation, the viewer eye sensor 107 and/or a processor analyzing data from the viewer eye sensor 107 takes into account other corrective eyewear worn by the viewer, such as specialized contact lenses or glasses. The viewer eye sensor 107 may sense eye information in addition to information about how a viewer is using the corrective eyewear, such as which lens, lens type, or lens strength the user is looking through to view the display 106. In one implementation, an adjustment to the adjustable optical component viewing device 105 takes into account additional corrective eyewear worn by the viewer.

The adjustable optical component viewing device 105 may be any suitable optical component that may adjust the response of a viewer's eye focus based on information from the viewer eye sensor 107. For example, the adjustable optical component viewing device 105 may be a variable lens that changes to update the focal position on the viewer's retina. The adjustable optical component viewing device 105 may include different types of components, such as a lens and a mirror that together adjust the view from the viewer's eye. The adjustable optical component viewing device 105 may be part of glasses, virtual reality headgear, or other viewing device. The adjustable optical component viewing device 105 may be a wearable or non-wearable device. The adjustable optical component viewing device 105 may be a non-wearable device such that a viewer may walk up to the viewing device to view an image through the device. The adjustable optical component viewing device 105 may adjust multiple properties, such as where the adjustable optical component viewing device 105 changes focal position on the viewer's retina as well as image magnification. The adjustable optical component viewing device 105 may be adjusted in combination with other factors, such as where the processor 101 or another processor adjusts the adjustable optical component viewing device 105 in conjunction with moving the position of the display 106 in relation to the viewer.

The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The processor 101 may communicate in a wired or wireless manner with the adjustable optical component viewing device 105, display 106, and viewer eye sensor 107. The computing system 100 may be a distributed cloud based system, such as where some processing is performed n the cloud and other processing is performed locally. For example, some processing may occur in the cloud, and the adjustable optical component eyewear 105 may perform additional processing. The processor 101 may receive information from the viewer eye sensor 107 and related to an image rendered on the display 106, and the processor 101 may cause the adjustable optical component viewing device 105 to adjust based on the received information.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include eye accommodation determination instructions 102 and optical component adjustment instructions 103.

The eye accommodation determination instructions 102 may include instructions to determine viewer eye accommodation information. The processor 101 may determine eye accommodation information based on information from the viewer eye sensor 107. The eye accommodation information may indicate focal distance information associated with the viewer eye.

The optical component adjustment instructions 103 may include instructions to adjust the adjustable optical component viewing device 105 based on the determined eye accommodation information. For example, the adjustable optical component 105, such as a variable lens, may be adjusted to change the eye accommodation such that the display surface is focused on the retina. For example, the actual focus of the viewer eye may be changed from the virtual focal object distance to the display surface distance when looking through the adjustable optical component viewing device 105. Other optical parameters may also be adjusted by the adjustable optical component viewing device 105, such as by adjusting a different component of the adjustable optical component viewing device 105. For example, magnification or brightness may be altered by adjusting the adjustable optical component viewing device 105. The parameters may be adjusted based on a target effect, such as a target effect of realism or distortion.

In one implementation, the processor 101 determines a manner to adjust the adjustable optical component viewing device 105 and re-renders the image on the display 106 together to achieve a desired effect. The processor 101 may re-render the image using the method described in relation to FIG. 4 below. As an example, the processor 101 may determine an updated virtual focal length and re-render the image based on the updated virtual focal length. In one implementation, the processor 101 re-renders the image on the display based on a determined focal object and determined virtual focal distance, such as where an enhancement effect is created for the virtual focal object. As an example, a selective blurring effect may be applied based on the focal object and the focal distance such that the focal object appears clearer than other objects farther from the focal object.

Figure 2:
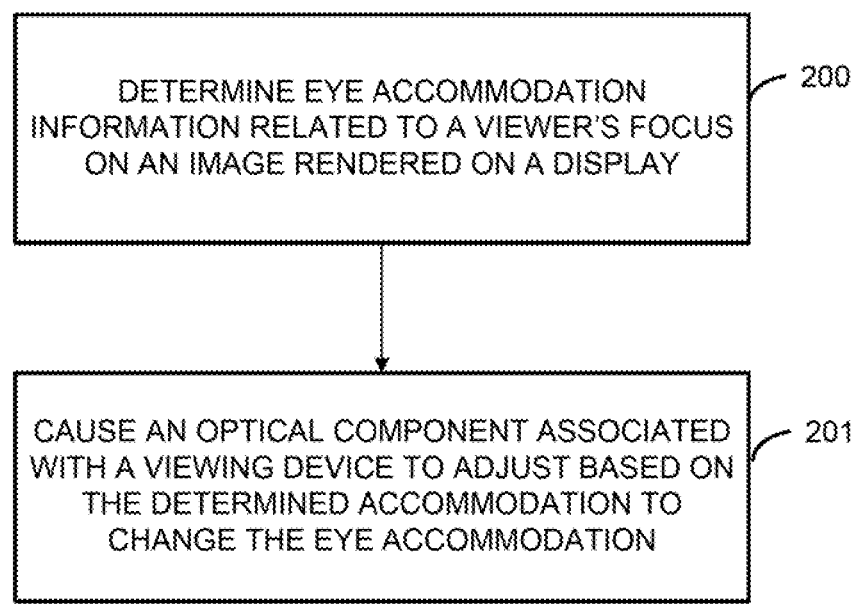
FIG. 2 is a flow chart illustrating one example of a method to adjust a viewing device based on accommodation in relation to a display.

FIG. 2 is a flow chart illustrating one example of a method to adjust a viewing device based on accommodation in relation to a display. For example, an optical component of a viewing device, such as a variable lens, may be adjusted based on viewer eye accommodation information in relation to an image rendered on a display. A processor may determine how to adjust the optical component to change the viewer eye focus to achieve a target focal distance. The method may be implemented, for example, by the processor 101 of FIG. 1.

Beginning at 200, a processor determines eye accommodation information related to a viewer's focus on an image rendered on a display. For example, the processor may receive information from a sensor to measure the viewer eye accommodation. The sensor may be, for example, a camera or other sensor that provides information about current eye focus. As an example, accommodation information related to a viewer of a 3D display may reveal that the viewer's focal distance is related to an object rendered to appear in front of or behind the display surface.

Continuing to 201, a processor causes an optical component associated with a viewing device to adjust based on the determined accommodation to change the eye accommodation. The optical component may be any suitable component, such as a lens. The optical component may be associated with glasses, virtual reality all in one viewing device and display headgear, or other type of viewing device. The viewing device may include an optical component to adjust the focus of one eye, both eyes, or two optical components such that each optical component affects each eye independently. The processor may update the optical component when updated sensor data indicating a change in accommodation is received. The optical component may dynamically adjust based on changes in accommodation. For example, accommodation may change as a viewer focuses on a different virtual object or moves relative to the display.

Figure 3:
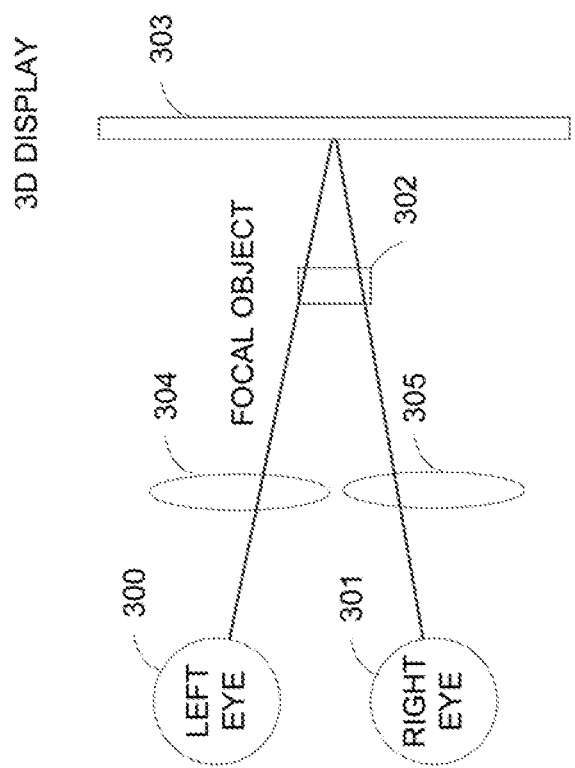
FIG. 3 is a diagram illustrating one example of a viewer using a viewing device to view a virtual image object on a display rendered to appear at a different depth than the display surface.

FIG. 3 is a diagram illustrating one example of a viewer using a viewing device to view a virtual image object on a display rendered to appear at a different depth than the display surface. For example, a computing system may dynamically adjust a viewing device based on viewer changes in eye accommodation in relation to an image rendered on a display. The viewing device may be adjusted to cause the viewer to focus at a target virtual depth position in relation to the display surface.

FIG. 3 shows optical components 304 and 305 to adjust viewer eye focus of the left eye 300 and right eye 301. The optical components 304 and 305 may be lenses or other components for adjusting a viewer's eye accommodation. For example, the optical components 304 and 305 may be automatically adjusted in response to sensor data related to eye accommodation information associated with the left eye 300 and right eye 301. As the viewer looks through the optical components 304 and 305, the viewer focus may change from the distance of the focal object 302 rendered on the display 303 to appear with a depth of the display 303 surface. Changing the eye focus to match the eye vergence may result in less viewer eye strain. Similarly, the optical components 304 may be adjusted for a single eye to change the depth effect but without determining the vergence of the two eye images.

Figure 4:
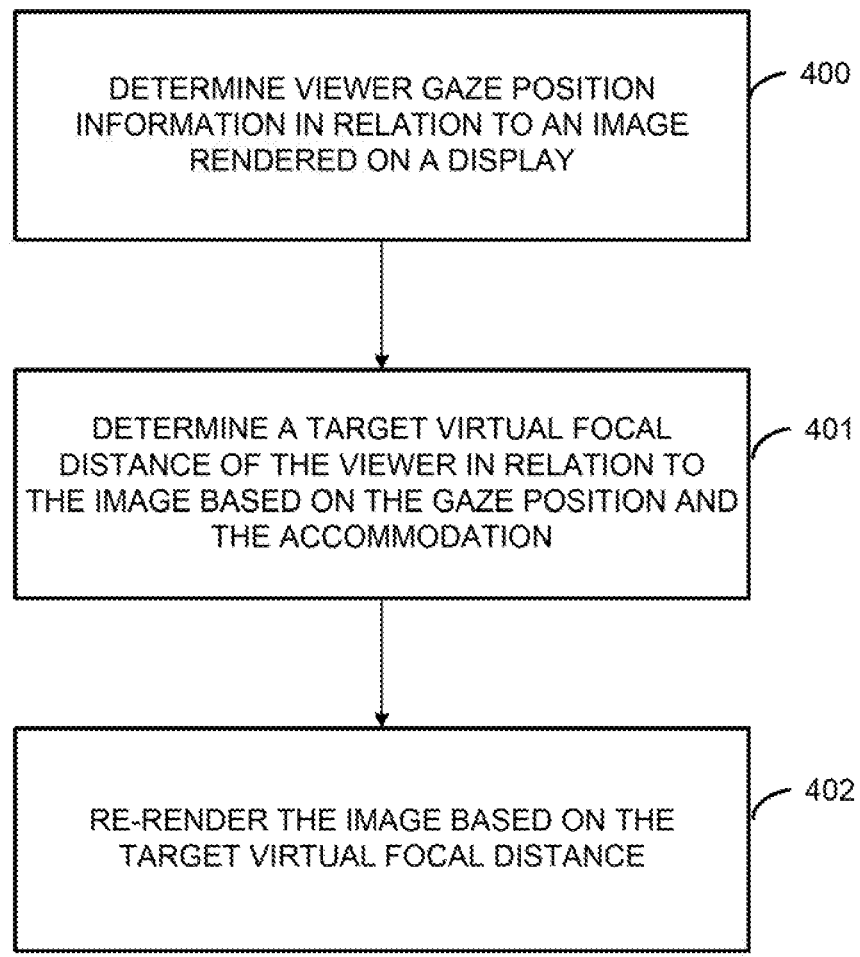
FIG. 4 is a flow chart illustrating one example of a method to re-render an image on a display based on eye accommodation and gaze position information in relation to the display.

FIG. 4 is a flow chart illustrating one example of a method to re-render an image on a display based on eye accommodation and gaze position information in relation to the display. For example, the accommodation information may be used in addition to gaze position information to determine focal object and/or focal distance information. The image may be re-rendered based on the focal object and/or focal distance to create a visual effect. The method may be implemented, for example, by the computing system 100.

Beginning at 400, a computing device, such as the processor 101, determines viewer gaze position information in relation to an image rendered on a display. The gaze position information may be determined based on information from a sensor. The sensor may be the same or a different sensor than the one for measuring eye accommodation. The sensor may be, for example, a camera or other device for measuring the viewing direction of the viewer eye. The computing device may determine a gaze position location on the display based on the eye viewing direction towards the display. The computing device may determine an image location based on image data associated with the display location.

Continuing to 401, a computing device determines a target virtual focal distance of the viewer in relation to the image based on the gaze position and the accommodation. For example, the computing device may determine a focal object in the image based on gaze position information from the viewer eye sensor and the accommodation information. Using the information, the computing system may determine the location of the viewer gaze position relative to the image and the depth at which the viewer is focusing to compare to information about the image data to determine a focal object associated with the image.

The processor may determine the target virtual focal distance based on the determined focal object associated with the image and target focal distance information associated with the object. For example, the image may be rendered such that the particular object is intended to appear a particular distance in front of or behind the display surface. The object may be rendered on a 2D image or on a 3D image to provide the depth effect. The virtual focal length may be determined based on a target effect associated with the object, such as a target distance in front of or behind the display surface. For example, a left and right eye image may be rendered on the display to create the effect that an object is 1 m in front of the display. Likewise, a single 2D image may be associated with a target effect to appear 1 m in front of the display.

Continuing to 402, a computing device re-renders the image based on the target virtual focal distance. In one implementation, the computing device re-renders the image on the display based on the determined focal object and/or virtual focal distance. For example, the processor may render the image with a depth of field at the virtual focal distance such that objects at the depth and gaze area are more in focus with other objects at farther or nearer relative virtual distances having a blurring effect. The processor may otherwise enhance an object determined to be in focus based on the accommodation and gaze position. For example, an object at a particular position and depth on the image associated with the determined user focus may be rendered with brighter colors and/or other enhancement effects.

In one implementation, additional eye vantage point information may be measured. For example, the computing system may measure eye accommodation and gaze position in addition to information about the relative position of the left and right eyes. The computing system may create a holographic effect by re-rendering the image in response to changes in the eye position. For example, the image may be re-rendered based on a change in eye and/or head position, such as where the image changes as a person looks to the right and sees additional objects on the right portion of the image.

Figure 5:
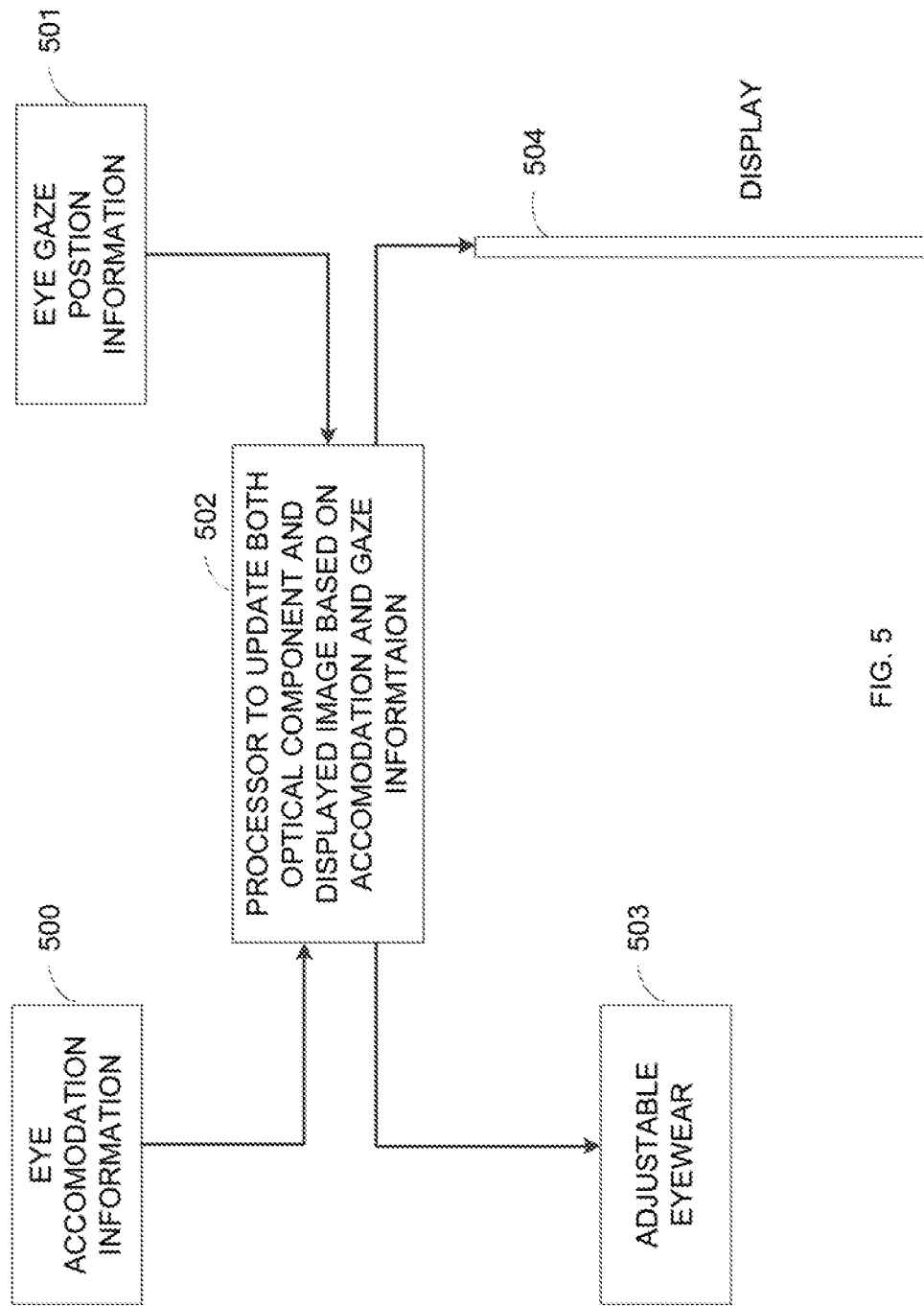
FIG. 5 is a diagram illustrating one example of a computing system to update an optical component of a viewing device and a displayed image based on eye gaze and accommodation information.

FIG. 5 is a diagram illustrating one example of a computing system to update an optical component of a viewing device and a displayed image based on eye gaze and accommodation information. The processor 502 may receive and/or determine eye accommodation information 500 and eye gaze position information 501. For example, the processor 502 may receive information from a sensor monitoring a viewer's eye. The processor 502 may cooperatively update both adjustable viewing device 503 and an image rendered on the display 504 based on the received eye accommodation information 500 and the eye gaze position information 501.

In one implementation, a processor re-renders an image on a display based on focal information. For example, the image may be re-rendered based on a target depth of field. The processor may create an enhancement effect at the point of focus, such as by brightening the color of a focal object relative to the surrounding image or blurring the surrounding image relative to the focal object.

In one implementation, the processor 502 may achieve an optical effect by adjusting the viewing device and image cooperatively, such as by simultaneously making the adjustable viewing device 503 darker and re-rendering the image on the display 504 and/or focal object of the image on the display 504 to be brighter. As another example, the adjustable viewing device 503 may cause the focal distance to change, and a 3D image on the display may be re-rendered to cause the left and right eye images to be closer or farther to further to change the vergence and bring the eye accommodation to the correct focus to make the vergence and accommodation match. The processor 502 may render a 2D image with an amount of distortion and change the adjustable viewing device 503 based on the distortion. As another example, the processor 502 may alter the resolution of the image based on both a change to the adjustable viewing device 503 and the display 504. In one implementation, the processor 502 may create some visual effects with the adjustable viewing device 503 and some visual effects based on the display 504 rendering, such as where the adjustable viewing device 503 changes the viewer focal length, and the processor 502 changes the magnification by re-rendering the image on the display 504 to make the image appear smaller. In one implementation, the changes to the visual effect may be made together with the adjustable viewing device 503 and the display 504, such as where some magnification adjustment is achieved based on changes in the adjustable viewing device 503 and some of the effect is achieved based on a change to the image.

In one implementation, the processor 502 may re-render the image on the display 504 such that the image appears at a different depth to different viewers based on their individual eye accommodation measurements and adjustable viewing device 503 adjustment. For example, a 3D image may be created based on a shuttering effect, and the image may be created to have the focal object appear at 1.5 m in front of the display for viewer A and at 1.25 m in front of the display for viewer B, and the optical components of the viewing devices associated with the viewers A and B may be updated based on the image rendering. The processor 502 may determine that viewer A and B are focused on different objects, and the image may be re-rendered on the display 504 to create a different enhancement and/or depth effect according to the different focal objects and distances. Any suitable multiplex method may be used to provide different images to different users, such as polarization, spatial based multiplexing, or time based multiplexing. For example, the image may be rendered with a multiplex effect, such as by rendering the image with different chromatic filters for the different users or by rendering the image with a shuttering time multiplex effect. The image presented to a first user may be rendered with a first depth of field, and an image presented to a second user may have a second depth of field.

Automatically adjusting a viewing device based on eye accommodation information may improve the user experience, such as by preventing eye strain. Further adjusting the displayed image based on gaze position and accommodation information may allow for altering the viewing experience, such as to make it more realistic or distorted in a specific manner.

The invention claimed is:

1. A computing system, comprising:
 a viewing device including a first adjustable optical component for a left eye and a second adjustable optical component for a right eye, wherein the first adjustable optical component and the second adjustable optical component affect the left eye and the right eye independently;
 a display to render an image comprising a left eye image and a right eye image;
 a viewer eye sensor; and
 a processor to:
  determine information about eye accommodation of a viewer viewing a focal object of the image on the display based on information from the viewer eye sensor;
  adjust the first adjustable optical component and the second adjustable optical component of the viewing device based on the eye accommodation to change the eye accommodation such that a display surface of the display is focused on a retina of a viewer;
  determine information about viewer gaze position;
  determine a virtual focal distance of the focal object based on the viewer gaze position relative to the image rendered on the display and based on the information about the eye accommodation; and
  re-render the focal object in the image based on the virtual focal distance, wherein the re-rendering is performed separately for the left eye image and the right eye image and comprises adjusting a magnification or a brightness of the focal object in the left eye image by the first adjustable optical component and the right eye image by the second adjustable optical component based on a target effect of realism or distortion.

2. The computing system of claim 1, wherein re-rendering the image comprises rendering a first version of the image based on the virtual focal distance and eye gaze position and rendering a second version of the image based on a second viewer's eye accommodation and eye gaze position.

3. The computing system of claim 1, wherein re-rendering the image comprises creating an enhancement effect on the image based on the focal object in the image determined based on eye gaze position and virtual focal distance.

4. The computing system of claim 1, wherein the processor to adjust the viewing device comprises the processor to adjust the viewing device based on a target visual effect.

5. The computing system of claim 1, wherein the processor is further to:
 determine an updated image parameter, wherein the viewing device is adjusted based on the eye accommodation and the updated image parameter.

6. The computing system of claim 1, wherein the processor is further to re-render the focal object in the image based on a virtual focal distance of a second viewer and the focal object is re-rendered using a shuttering effect to appear at different depths for the viewer and the second viewer.

7. A method, comprising:
 determining eye accommodation information related to a viewer's focus of a focal object in an image rendered on a display, wherein the image comprises a left eye image and a right eye image;
 causing, by a computing system, a first optical component for a left eye and a second adjustable optical component for a right eye associated with a viewing device to adjust based on the eye accommodation information that is determined to change the eye accommodation such that a display surface of the display is focused on a retina of a viewer, wherein the first adjustable optical component and the second adjustable optical component affect the left eye and the right eye independently;
 determining viewer gaze position information in relation to the focal object in the image rendered on the display;
 determining, by the computing device, a target virtual focal distance of a viewer in relation to the focal object in the image based on the viewer gaze position and the eye accommodation information; and
 re-rendering the focal object in the image based on the target virtual focal distance, wherein the re-rendering is performed separately for the left eye image and the right eye image and comprises adjusting a magnification or a brightness of the focal object in the left eye image by the first adjustable optical component and the right eye image by the second adjustable optical component based on a target effect of realism or distortion.

8. The method of claim 7, wherein re-rendering the image comprises re-rendering the image to enhance the focal object at the target virtual focal distance.

9. The method of claim 7, wherein re-rendering the image comprises re-rendering the image to create a blurring effect based on the target virtual focal distance.

10. The method of claim 7, further comprising:
determining relative viewer eye position; and
causing the image to be re-rendered to provide a holographic effect based on the relative viewer eye position.

11. A machine-readable non-transitory storage medium comprising instructions executable by a processor to:
dynamically adjust a viewing device based on viewer changes in eye accommodation in relation to a focal object in an image rendered on a display, wherein the image comprises a left eye image and a right eye image, wherein the viewing device comprises a first adjustable optical component for a left eye and a second adjustable optical component for a right eye, wherein the first adjustable optical component and the second adjustable optical component affect the left eye and the right eye independently and the viewing device is adjusted to cause a viewer to focus at a display-surface of the display; and determine information about viewer gaze position;

determine a virtual focal distance based on the viewer gaze position relative to the focal object in the image rendered on the display and based on the information about the eye accommodation; and re-render the focal object in the image based on the virtual focal distance, wherein the re-rendering is performed separately for the left eye image and the right eye image and comprises adjusting a magnification or a brightness of the focal object in the left eye image by the first adjustable optical component and the right eye image by the second adjustable optical component based on a target effect of realism or distortion.

12. The machine-readable non-transitory storage medium of claim 11, wherein instructions to re-render the image comprise instructions to re-render the image to enhance an appearance of the focal object.

13. The machine-readable non-transitory storage medium of claim 11, further comprising instructions to re-render cooperatively with the viewing device that is adjusted.

* * * * *